US012135314B2

(12) United States Patent
Maeda

(10) Patent No.: US 12,135,314 B2
(45) Date of Patent: Nov. 5, 2024

(54) CHROMATOGRAPH MASS SPECTROMETER

(71) Applicant: SHIMADZU CORPORATION, Kyoto (JP)

(72) Inventor: Kazuma Maeda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 445 days.

(21) Appl. No.: 17/601,742

(22) PCT Filed: Jun. 20, 2019

(86) PCT No.: PCT/JP2019/024532
§ 371 (c)(1),
(2) Date: Oct. 6, 2021

(87) PCT Pub. No.: WO2020/255340
PCT Pub. Date: Dec. 24, 2020

(65) Prior Publication Data
US 2022/0196614 A1 Jun. 23, 2022

(51) Int. Cl.
G01N 30/72 (2006.01)
G01N 30/86 (2006.01)
H01J 49/00 (2006.01)

(52) U.S. Cl.
CPC ......... *G01N 30/72* (2013.01); *G01N 30/8631* (2013.01); *H01J 49/0036* (2013.01)

(58) Field of Classification Search
CPC ............... G01N 30/72; G01N 30/8631; G01N 30/8651; G01N 27/62; H01J 49/0036; H01J 49/0027

(Continued)

(56) References Cited

U.S. PATENT DOCUMENTS

2013/0240727 A1 9/2013 Sumiyoshi et al.
2016/0209378 A1* 7/2016 Kobayashi .......... H01J 49/4225
(Continued)

FOREIGN PATENT DOCUMENTS

CN 108389772 A 8/2018
JP 2012-132799 A 7/2012
WO 2015/029101 A1 3/2015

OTHER PUBLICATIONS

Office Action dated Sep. 20, 2022 issued by the Japanese Patent Office in Japanese Application No. 2021-528567.
(Continued)

*Primary Examiner* — Michael Maskell
(74) *Attorney, Agent, or Firm* — Sughrue Mion, PLLC

(57) ABSTRACT

A chromatograph mass spectrometer according to an aspect of the present invention is a chromatograph mass spectrometer including: a chromatograph unit (LC unit 1) configured to separate components in a sample; and a mass spectrometer (MS unit 2) configured to execute mass spectrometry on ions having a specific mass-to-charge ratio derived from a compound for each compound temporally separated by the chromatograph unit, the chromatograph mass spectrometer further including: an analysis condition setting unit (30) configured to allow a user to input a width of a peak on a chromatogram as one of analysis parameters; a data point number storage (311) configured to store information on an appropriate number of data points corresponding to one peak; a sampling time interval calculator (312) configured to calculate a sampling time interval, which is a timing for acquiring data for creating the chromatogram, from the inputted peak width and data point number; and an analysis control unit (32) configured to control an operation of the mass spectrometer so as to acquire ion intensity data in the mass spectrometer according to the sampling time interval.

3 Claims, 4 Drawing Sheets

(58) Field of Classification Search
USPC .................................................. 250/281, 282
See application file for complete search history.

(56) References Cited

U.S. PATENT DOCUMENTS

2017/0138916 A1* 5/2017 Sumiyoshi ......... G01N 30/7233
2018/0224406 A1  8/2018 Xuan

OTHER PUBLICATIONS

International Search Report of PCT/JP2019/024532 dated Aug. 20, 2019 [PCT/ISA/210].
Written Opinion of PCT/JP2019/024532 dated Aug. 20, 2019 [PCT/ISA/237].
Chinese Office Action dated Jan. 18, 2024 in Chinese Application No. 201980094747.9.

* cited by examiner

| | COMPOUND TO BE MEASURED | MEASUREMENT TIME RANGE | MEASUREMENT TYPE | MEASUREMENT TARGET m/z |
|---|---|---|---|---|
| EVENT 1 | COMPOUND A | 2.0~3.0 | SIM | 100, 115, 126 |
| EVENT 2 | COMPOUND B | 2.5~3.5 | SIM | 200, 238 |
| EVENT 3 | COMPOUND C | 2.7~3.7 | SIM | 250, 267, 288 |
| EVENT 4 | COMPOUND D | 4.0~5.0 | SIM | 300, 320 |
| EVENT 5 | COMPOUND E | 4.6~5.6 | SIM | 350, 368 |

PEAK WIDTH : 3.0 sec

SAVE    CANCEL

CHROMATOGRAPH MASS SPECTROMETER

CROSS REFERENCE TO RELATED APPLICATIONS

This application is a National Stage of International Application No. PCT/JP2019/024532, filed Jun. 20, 2019.

TECHNICAL FIELD

The present invention relates to a chromatograph mass spectrometer, in which a chromatograph and a mass spectrometer are combined, such as a gas chromatograph mass spectrometer (GC-MS) or a liquid chromatograph mass spectrometer (LC-MS).

BACKGROUND ART

Conventionally, a chromatograph such as a liquid chromatograph (LC) or a gas chromatograph (GC) is widely utilized in order to perform qualification or quantitative determination of various components in a sample. In a general liquid chromatograph, an optical detector such as a photodiode array detector is used as a detector. In recent years, a liquid chromatograph mass spectrometer is often utilized in which a mass spectrometer such as a quadrupole mass spectrometer having higher separation performance for a plurality of compounds is combined with a liquid chromatograph, instead of an ordinary liquid chromatograph.

In general, in a case where quantitative determination of a target compound is performed utilizing a chromatograph mass spectrometer, SIM (selected ion monitoring) measurement for selectively detecting ions having a mass-to-charge ratio (m/z) corresponding to the target compound is repeatedly performed within a predetermined measurement time range including a retention time at which the target compound is estimated to be eluted from a column of a chromatograph and introduced into a mass spectrometer.

In a case where a target compound is contained in a sample, a substantially chevron-shaped peak corresponding to the target compound appears in a chromatogram (extracted ion chromatogram) created on the basis of ion intensity signals obtained by repeating SIM measurement on a mass-to-charge ratio corresponding to the target compound. The area of this peak reflects the amount or concentration of the target compound. Therefore, the quantitative value is calculated by calculating the area of the peak on the chromatogram and comparing the area value with a calibration curve created in advance.

In order to improve the accuracy of quantitative determination in data processing as described above, it is necessary to correctly determine the peak area. For this purpose, it is necessary for the peak to have an accurate shape in the chromatogram. In general, a chromatogram waveform is formed using data (ion intensity value data) obtained at regular time intervals, and the accuracy of the waveform of the peak lowers when the number of data points constituting one peak is small (see Patent Literature 1 and the like). In other words, it is necessary to improve the precision of the peak waveform on the chromatogram in order to improve the quantitative determination accuracy.

CITATION LIST

Patent Literature

Patent Literature 1: JP 2012-132799 A
Patent Literature 2: WO 2015/029101 A

SUMMARY OF INVENTION

Technical Problem

The precision of the peak waveform is improved by shortening the time interval of data acquisition (which will be hereinafter referred to as "sampling time interval"). By decreasing the sampling time interval, however, the data collecting time (dwell time) corresponding to ions derived from a compound to be measured is shortened accordingly, so that the detection sensitivity lowers. As described above, the sampling time interval or the number of data points per unit time is one of important parameters related to the analysis performance.

A chromatograph mass spectrometer that allows a user to set in advance a sampling rate, that is, the number of data points per second as one of parameters has been conventionally known. As described in Patent Literature 1, it is generally said that approximately 10 or more data points are required for one peak in order to obtain sufficient peak area reproducibility. Therefore, a user may determine an appropriate sampling rate in consideration of such a situation and input the value as a parameter.

However, similarly to the sampling time interval, the sampling rate is a parameter that is difficult to understand visually or intuitively. Thus, there is a problem that it is difficult to set an appropriate value, and a setting error is likely to occur unless the operator understands the technical content of data processing in the mass spectrometer to some extent.

The present invention has been made to solve such problems, and an object of the invention is to provide a chromatograph mass spectrometer that reduces the workload of setting analysis conditions in chromatograph mass spectrometry and allows even an operator who has little knowledge or experience particularly on chromatograph mass spectrometry to set parameters relatively easily and without errors.

Solution to Problem

A chromatograph mass spectrometer according to an aspect of the present invention made to solve the above problems is a chromatograph mass spectrometer including: a chromatograph unit configured to separate components in a sample; and a mass spectrometer configured to execute mass spectrometry on ions having a specific mass-to-charge ratio derived from a compound for each compound temporally separated by the chromatograph unit, the chromatograph mass spectrometer further including:

an analysis condition setting unit configured to allow a user to input a width of a peak on a chromatogram as one of analysis parameters;

a data point number storage configured to store information on an appropriate number of data points corresponding to one peak on a chromatogram;

a sampling time interval calculator configured to calculate a sampling time interval, which is a timing for acquiring data for creating a chromatogram, from the width of a peak inputted through the analysis condition setting unit and the information of the number of data points stored in the data point number storage; and an analysis control unit configured to control an operation of the mass spectrometer so as to acquire ion intensity data in the mass spectrometer according to the sampling time interval.

The above chromatograph unit is a liquid chromatograph or a gas chromatograph. The mass spectrometer is typically a quadrupole mass spectrometer or a triple quadrupole mass spectrometer.

The above chromatogram is typically an extracted ion chromatogram at a specific mass-to-charge ratio or an extracted ion chromatogram obtained from a specific multiple reaction monitoring (MRM) transition (a combination of the mass-to-charge ratio of a precursor ion and the mass-to-charge ratio of product ions).

Advantageous Effects of Invention

In a chromatograph mass spectrometer according to an aspect of the present invention, when the operator (user) inputs a value of a peak width estimated to appear in the chromatogram through the analysis condition setting unit, the sampling time interval calculator automatically calculates the sampling time interval on the basis of the estimated value of the peak width and information on the number of data points for one peak stored in the data point number storage. The sampling time interval mentioned here is a parameter for determining a time interval of a plurality of data (ion intensity data) constituting one chromatogram, and each of the data is, for example, intensity data of ions having a specific mass-to-charge ratio obtained by one shot of an SIM measurement, intensity data of ions obtained by one time scan measurement having a specific mass-to-charge ratio in a predetermined mass-to-charge ratio range, intensity data of ions having a specific mass-to-charge ratio obtained by one MRM measurement, or the like.

Since a peak width can be visually grasped from a chromatogram drawn generally on a display screen, it is easy for the operator to intuitively understand the peak width. Thus, with a chromatograph mass spectrometer according to an aspect of the present invention, even an operator who has little knowledge about chromatograph mass spectrometry or is unfamiliar with work for such analysis can set appropriate parameter values easily and without errors and can execute analysis under such appropriate analysis conditions. That is, with a chromatograph mass spectrometer according to an aspect of the present invention, the work for setting the analysis conditions in analysis becomes easy, and the operability or workability is improved.

DESCRIPTION OF EMBODIMENTS

Hereinafter, an LC-MS according to an embodiment of the present invention will be described with reference to the accompanying drawings.

Figure 1:
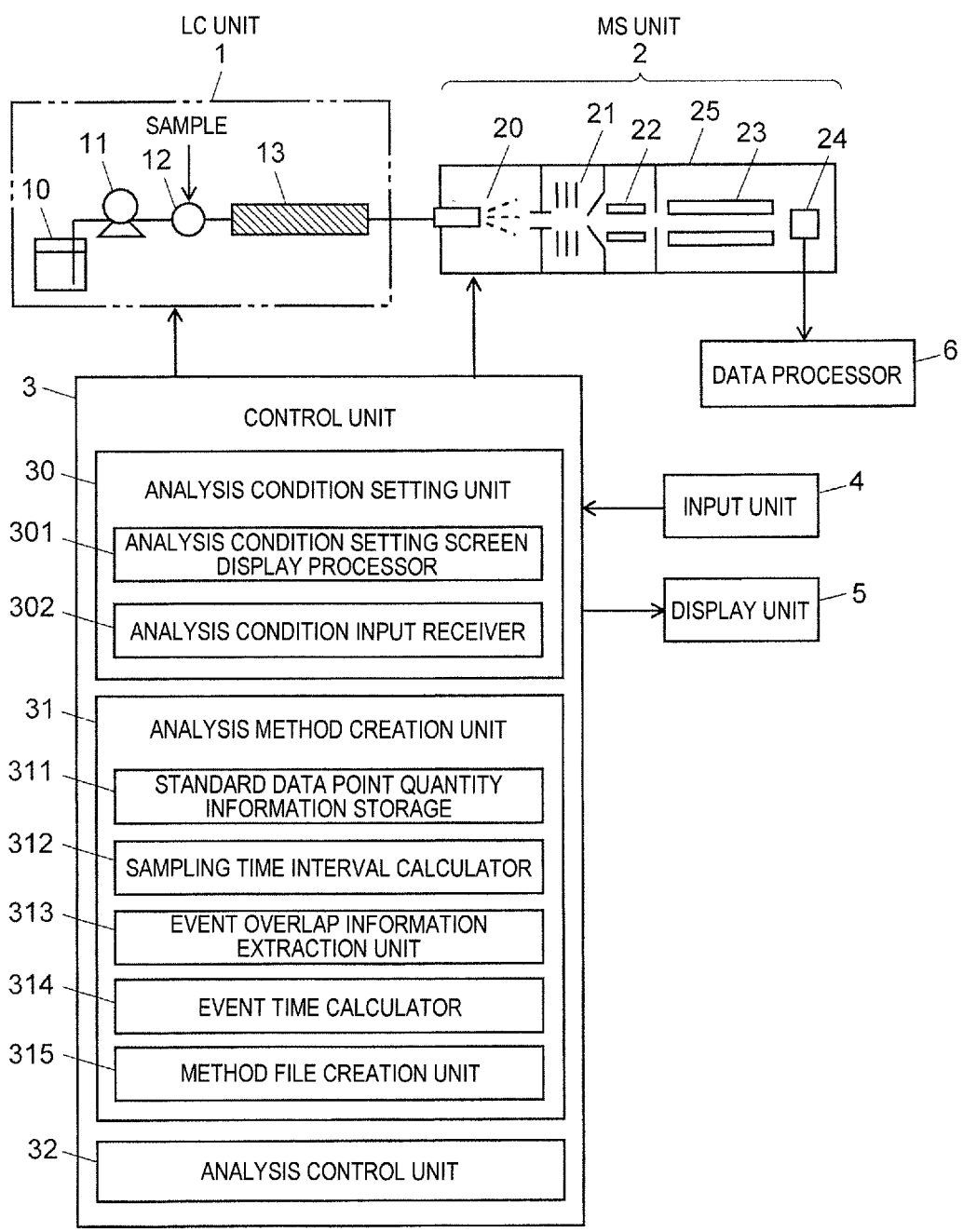
FIG. 1 is a configuration diagram of a main part of an LC-MS according to an embodiment of the present invention.

FIG. 1 is a configuration diagram of a main part of an LC-MS of the present embodiment.

The LC-MS of the present embodiment includes a liquid chromatograph unit (LC unit) 1 and a mass spectrometer unit (MS unit) 2 as measurement units, a control unit 3, an input unit 4, a display unit 5, and a data processor 6.

The LC unit 1 includes a mobile phase container 10 that stores a mobile phase, a liquid feeding pump 11 that draws the mobile phase and delivers the mobile phase at a fixed flow rate, an injector 12 that injects a sample into the mobile phase at a predetermined timing, a column 13 that separates various compounds in the sample in a time direction, and the like.

The MS unit 2 includes an ionization unit 20 that ionizes a compound contained in a liquid sample eluted from the column 13, ion guides 21 and 22 that transport generated ions, a quadrupole mass filter 23 that selectively allows ions having a specific mass-to-charge ratio m/z among ions derived from one compound to pass, a detector 24 that detects selected ions, and the like. The ionization unit 20 is, for example, an ion source that uses an atmospheric pressure ionization method such as an ESI method for ionizing a compound in a liquid sample under an atmospheric pressure ambience, and the inside of the chamber 25 is partitioned into a plurality of rooms in which the degree of vacuum increases stepwise.

The control unit 3 that controls each of the LC unit 1 and the MS unit 2 includes, as functional blocks, an analysis condition setting unit 30, an analysis method creation unit 31, and an analysis control unit 32. As lower functional blocks, the analysis condition setting unit 30 includes an analysis condition setting screen display processor 301 and an analysis condition input receiver 302, and the analysis method creation unit 31 includes a standard data point number storage 311, a sampling time interval calculator 312, an event overlap information extraction unit 313, an event time calculator 314, and a method file creation unit 315.

The control unit 3 and the data processor 6 can include a personal computer having a CPU, a memory, and the like as hardware, and dedicated control and processing software installed in advance in the computer is executed on the computer to realize at least a part of the functions.

Now, the LC/MS analysis operation executed by the LC unit 1 and the MS unit 2 in the LC-MS of the present embodiment will be briefly described.

In the LC unit 1, the liquid feeding pump 11 draws the mobile phase from the mobile phase container 10 and feeds the mobile phase to the column 13 at a fixed flow rate. When the liquid sample is injected into the mobile phase in the injector 12 at a predetermined timing under the control of the analysis control unit 32, the injected sample is pushed by the mobile phase and introduced into the column 13. Then, various compounds in the sample are separated in the time direction by interaction with the liquid phase of the column 13 while passing through the column 13, and are eluted from the outlet of the column 13 in a temporally shifted manner.

Generally, when quantitative analysis of a specific compound having a known molecular weight, or checking of whether the compound is present in a sample or not (detection of presence or absence) is performed, the MS unit 2 repeatedly performs SIM measurement to measure a mass-to-charge ratio corresponding to the specific compound. In SIM measurement, the analysis control unit 32 determines a voltage to be applied to the quadrupole mass filter 23 so that ions having a mass-to-charge ratio to be measured selectively pass through the quadrupole mass filter 23. The compounds in the eluate from the column 13 are ionized in the ionization unit 20, and the ions generated in the ionization unit 20 are transported by the ion guides 21 and 22 and introduced into the quadrupole mass filter 23. Among various ions derived from the compound, only ions having a specific mass-to-charge ratio depending on the voltage applied to the quadrupole mass filter 23 pass through the quadrupole mass filter 23 and enter the detector 24. The detector 24 outputs an ion intensity signal corresponding to the amount of entering ions as a detection signal.

When SIM measurement on a certain compound is repeatedly executed within a measurement time range of a predetermined time duration around a retention time at which the compound is eluted from the column 13 and introduced into the MS unit 2, and a chromatogram (extracted ion chromatogram) showing a temporal change of a detection signal at that time is created in the data processor 6, a peak appears in the chromatogram in a case where the compound is contained in the sample. The area of this peak corresponds to the content of the compound. Accordingly, the amount (concentration) of the compound contained in the sample can be found by calculating the peak area on the chromatogram and comparing the peak area with a calibration curve created in advance.

Figures 2, 3:
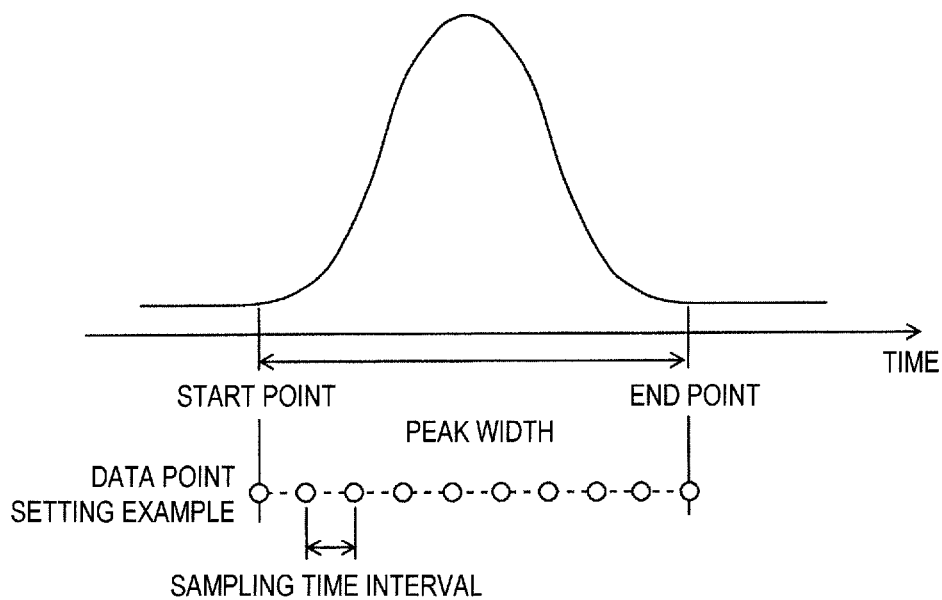
FIG. 2 is a diagram illustrating an example of an analysis condition setting screen in the LC-MS of the present embodiment.
FIG. 3 is a conceptual diagram for describing the relationship between a peak width and a sampling time interval set in the LC-MS of the present embodiment.
Figure 4:
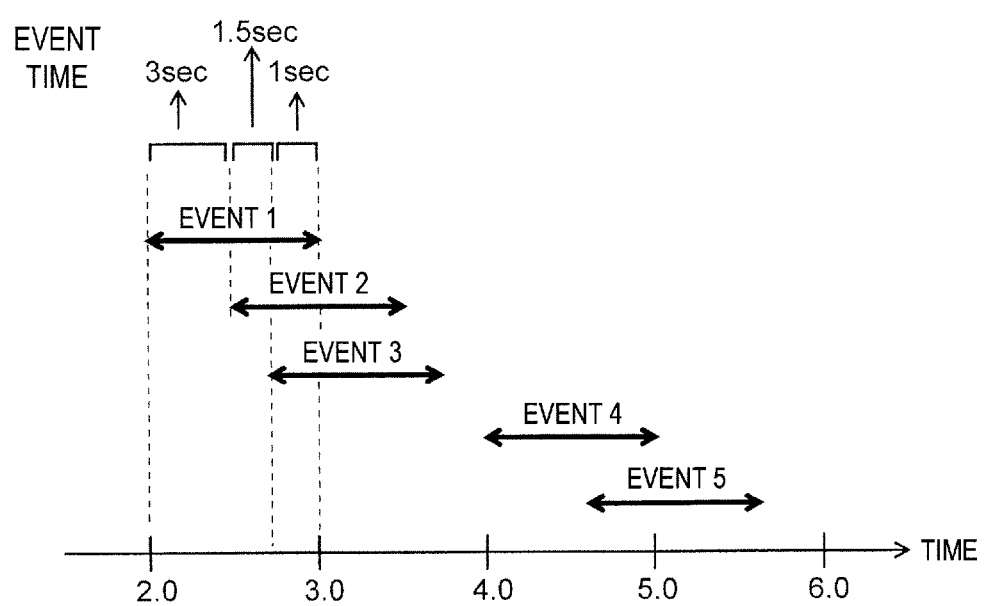
FIG. 4 is a conceptual diagram illustrating the relationship between measurement time ranges of a plurality of events in the LC-MS of the present embodiment.
Figure 5:
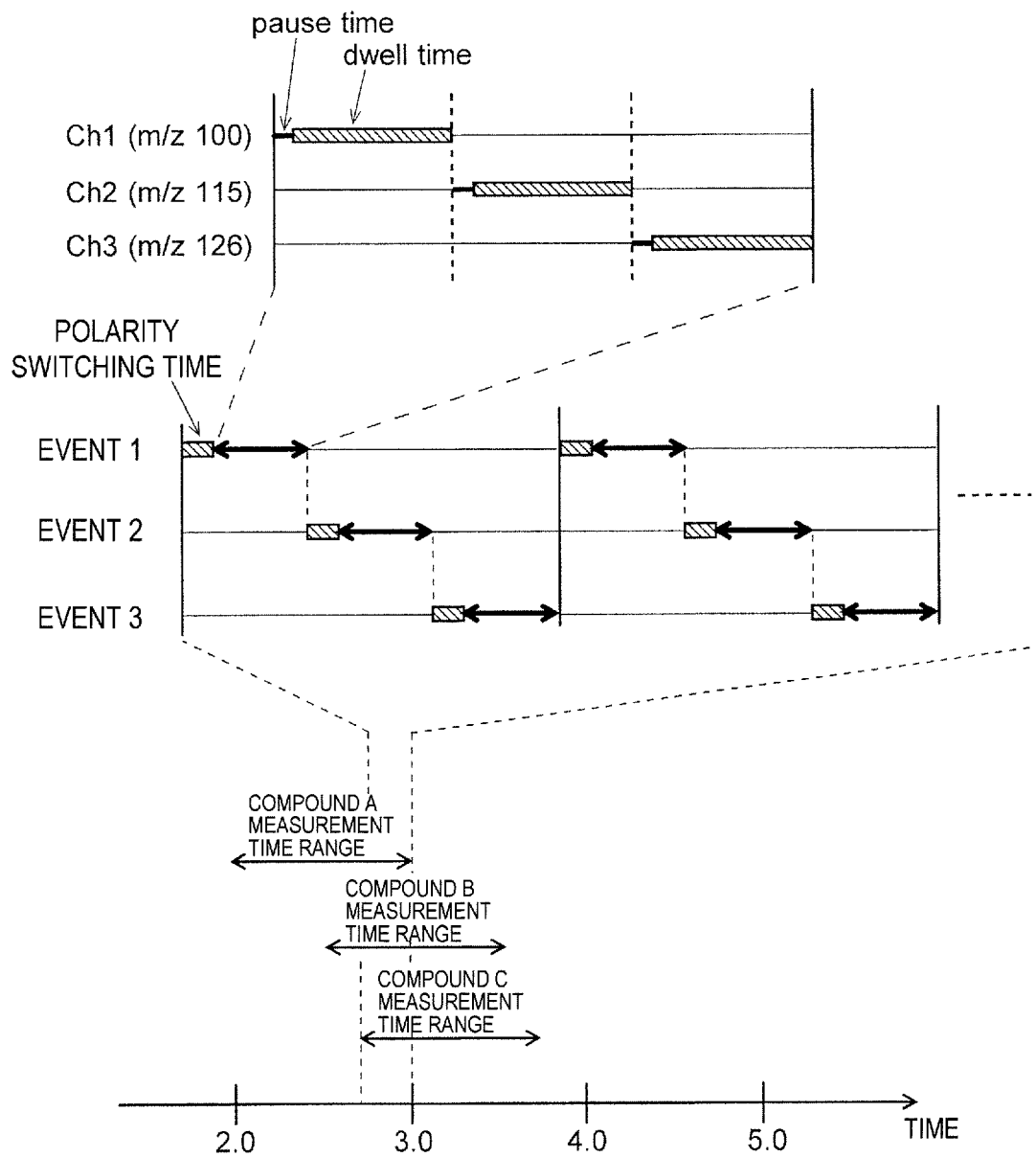
FIG. 5 is an explanatory diagram of an analysis sequence of a case where measurement time ranges of a plurality of events overlap each other.

Next, a characteristic analysis operation in the LC-MS of the present embodiment will be described with reference to FIGS. 2 to 5. FIG. 2 is a diagram illustrating an example of an analysis condition setting screen. FIG. 3 is a conceptual diagram for describing the relationship between a peak width and a sampling time interval set by a user. FIG. 4 is a conceptual diagram illustrating the relationship between measurement time ranges of a plurality of events. FIG. 5 is an explanatory diagram of an analysis sequence of a case where measurement time ranges of a plurality of events overlap each other.

Here, it is assumed that multi-component batch analysis is performed to simultaneously detect a certain number of compounds that can be contained in a sample. First, an operator sets analysis conditions in advance for each compound to be measured. Specifically, when the operator gives a predetermined instruction through the input unit 4, the analysis condition setting screen display processor 301 of the analysis condition setting unit 30 displays an analysis condition setting screen 100 as illustrated in FIG. 2 on the display unit 5. The analysis condition setting screen 100 includes an analysis condition setting table 102 and a peak width input setting unit 104. FIG. 2 illustrates a state in which parameters of the analysis conditions have already been set in the analysis condition setting table 102, and in a case where a parameter has not been set, each field of the table is blank, or a default parameter is inputted.

Although details will be described later, analysis conditions are set with a work unit called an event in the LC-MS of the present embodiment. In principle, one event is for one compound to be measured and includes conditions for the same type of measurements (for example, SIM measurement and scan measurement are the same type of measurements) for the compound. In the example of FIG. 2, "Event 1" assumes Compound A as a compound to be measured, and executes SIM measurement for three mass-to-charge ratios of m/z 100, m/z 115, and m/z 126 with a measurement time range of 2 to 3 minutes. Analysis conditions for one compound may be divided into a plurality of events.

As described above, a user sets the measurement target range, the measurement type, and the measurement target m/z (measurement target m/z range in the case of scan measurement) for each compound to be measured.

A text box for inputting a numerical value is arranged in the peak width input setting unit 104. A user estimates the width of a peak to be observed on the chromatogram (extracted ion chromatogram) obtained as a result of the analysis, and inputs the estimated value into the text box. Here, as illustrated in FIG. 3, the above peak width is a time duration from the start point to the end point of one peak, or may be a half-value width or the like.

The width of the peak depends on the separation conditions in the LC unit 1, and in a case where gradient elution is performed, for example, the width of the peak changes with the lapse of time. In this case, a peak width assumed to be the narrowest may be inputted for the compound to be measured here. This is because, if a peak width assumed to be the narrowest is inputted, a sufficient number of data points can be determined such that the reproducibility of the peak area becomes favorable for a peak having a wider peak width.

When the analysis condition setting screen 100 is displayed, a default value or a value set at the most recent time point may be displayed in the text box of the peak width input setting unit 104, so that the input operation becomes unnecessary in a case where it is unnecessary to change the value.

When an operator inputs necessary parameters on the analysis condition setting screen 100 and then clicks the "Save" button 106, the analysis condition input receiver 302 confirms the parameters inputted at that time point and temporarily saves the parameters in an internal memory.

In the analysis method creation unit 31, the sampling time interval calculator 312 calculates the sampling time interval from data point number stored in the standard data point number storage 311, and the previously inputted peak width. The data point number is the number of data points for one peak on the chromatogram. As described above, since it is generally considered preferable that the number of data points for one peak is 10 or more from the viewpoint of peak area reproducibility, "10" may be set, for example, as data point number. Of course, in the case of qualification or simple checking of the presence or absence of a compound, the number of data points may be smaller, and thus a value other than the above may be used, or a user may appropriately change the value.

For example, in a case where the peak width is 3 sec and the data point number is "10", the sampling time interval calculator 312 determines 3/10=0.3 sec as the sampling time interval (see FIG. 3).

Next, the event overlap information extraction unit 313 determines the number of overlapping events in each time period from the measurement time range of each event set in the analysis condition setting table. For example, in the case of the example illustrated in FIG. 2, the number of events is "1" during the measurement time of 2 to 2.5 minutes since there is only Event 1, the number of events is "2" during the measurement time of 2.5 to 2.7 minutes since Event 1 and Event 2 overlap each other, and the number of events is "3" during the measurement time of 2.7 to 3 minutes since Event 1, Event 2, and Event 3 overlap each other (see FIG. 4). Then, the event time calculator 314 divides the above sampling time interval by the number of events to calculate the event time allotted to one event for each time period for the same number of events. In the example of FIG. 4, the event time during the measurement time of 2 to 2.5 minutes is 0.3 seconds, the event time during the measurement time of 2.5 to 2.7 minutes is 0.15 seconds, and the event time during the measurement time of 2.7 to 3 minutes is 0.1 seconds. Of course, the event time is shortened as the number of events becomes larger.

Then, the method file creation unit 315 determines an analysis sequence on the basis of the analysis conditions with an event unit summarized in the analysis condition setting table as described above, and creates a method file in a format that can be processed by the analysis control unit 32 according to the analysis sequence. Here, the analysis sequence is determined as follows.

In the example illustrated in FIG. 2, SIM measurements for three mass-to-charge ratios are set in Event 1. In the LC-MS of the present embodiment, SIM measurement for one mass-to-charge ratio is managed with a work unit called a channel that is lower than the event. Accordingly, Event 1 includes three channels, and Event 2 includes two channels. Of course, there may be a case where one event includes only one channel.

FIG. 5 illustrates the relationship between an event and a channel in a period of measurement time of 2.7 to 3 minutes in which three events overlap each other. In a case where a plurality of events overlap each other, the plurality of events are sequentially carried out one by one in a time division manner, and this is periodically repeated. One execution time of one event is the event time described above. Accordingly, in this example, one execution time of one event is 0.1 seconds. The time (referred to as loop time) required for each of the three events of Event 1, Event 2, and Event 3 to be carried out one time coincides with the sampling time interval, and is 0.3 seconds here.

In one event, one or a plurality of channels allotted to the event are sequentially carried out one time. For example, in Event 1, three of a channel (Ch1) that is SIM measurement for m/z 100, a channel (Ch2) that is SIM measurement for m/z 115, and a channel (Ch3) that is SIM measurement for m/z 126 are executed sequentially. Pause time in each channel is a time for switching a voltage applied to the quadrupole mass filter 23 so as to selectively allow ions having a mass-to-charge ratio to be measured to pass, and dwell time is a time for actually acquiring ion intensity data in SIM measurement. The execution time of each channel may be a time obtained by simply dividing the event time by the number of channels.

For the relationship between an event and a channel, a technique disclosed in Patent Literature 2 or the like, for example, can be utilized.

As described above, a plurality of events having overlapping measurement time ranges are sequentially and periodically performed in a time division manner, and a plurality of channels included in one event are sequentially carried out in a time division manner within the time of the event. Accordingly, when focusing on a certain mass-to-charge ratio (e.g., m/z 100), SIM measurement for the mass-to-charge ratio is executed every loop time, that is, every sampling time interval, and one ion intensity data is obtained by the SIM measurement. This also applies to other mass-to-charge ratios included in the same event. If there are little overlap of events or there is no overlap of events, the event time becomes long, and the execution time of one channel is determined by the number of channels included in one event. Therefore, regardless of the number of overlapping events or the number of channels included in one event, SIM measurement on a certain mass-to-charge ratio is executed for each loop time, and ion intensity data for creating a chromatogram is obtained at the sampling time interval.

The method file creation unit 315 determines the analysis sequence as described above, creates a method file for executing this analysis sequence, and stores the file in an internal storage. Then, when the operator gives an instruction to execute the analysis, for example, the analysis control unit 32 controls the LC unit 1 and the MS unit 2 according to the stored method file to execute the LC/MS analysis. The detection signal obtained by the detector 24 of the MS unit 2 is sent to the data processor 6 every moment, and the data processor 6 creates a chromatogram (extracted ion chromatogram) corresponding to an ion species derived from the compound for each compound to be measured on the basis of the detection signal.

If the operator has set an appropriate peak width as an analysis condition, a peak waveform having favorable reproducibility of the peak area should be observed on the chromatogram. Accordingly, quantitative analysis can be performed with high accuracy by calculating the peak area from this chromatogram and determining a quantitative value from the calculated peak area.

A parameter such as the sampling time interval or the sampling rate (the number of data points per unit time) is difficult for the operator to intuitively understand, while the peak width is often confirmed by the operator and is easy to intuitively understand. Thus, there are advantages that the input setting of the peak width is easier for the operator than the sampling time interval or the sampling rate, and it is easy to immediately notice if an input error occurs.

In the LC-MS of the above embodiment, the event time is calculated by dividing the sampling time interval by the number of overlapping events in a case where a plurality of events overlaps each other in the same time period. Although this is based on the assumption that the same event time is allotted to all of the plurality of overlapping events, weighting may be performed on the plurality of overlapping events, and the sampling time interval may be distributed according to the weight to determine the event time of each event.

Since a longer event time is more advantageous in increasing the detection sensitivity, the weight of an event corresponding to a compound may be increased when, for example, a compound assumed to have a small content or a low concentration is measured. When a compound assumed to have a narrow peak width is measured, the weight of an event corresponding to the compound may be increased.

The above embodiment is merely an example of the present invention, and it is a matter of course that deformations, modifications, additions, and the like appropriately made within the scope of the gist of the present invention are included in the claims of the present application.

For example, the format or form for setting the analysis conditions on the analysis condition setting screen 100 or the like is not limited to the examples described above, and can be appropriately changed. What is important is that an operator can set an assumed peak width, and that an operator can set analysis conditions such as a measurement time range or a mass-to-charge ratio to be measured in SIM measurement (or a mass-to-charge ratio range to be measured in scan measurement).

The present invention is applied to an LC-MS including a single-type quadrupole mass spectrometer in the above embodiment. However, it is obvious that the present invention can also be applied to an LC-MS including a tandem mass spectrometer such as a triple quadrupole mass spectrometer.

[Various Aspects]

It will be understood by those skilled in the art that the exemplary embodiments described above are specific examples of the following aspects.

(Clause 1) A chromatograph mass spectrometer according to an aspect of the present invention is a chromatograph mass spectrometer including: a chromatograph unit configured to separate components in a sample; and a mass spectrometer configured to execute mass spectrometry on ions having a specific mass-to-charge ratio derived from a compound for each compound temporally separated by the chromatograph unit, the chromatograph mass spectrometer further including:

an analysis condition setting unit configured to allow a user to input a width of a peak on a chromatogram as one of analysis parameters;

a data point number storage configured to store information on an appropriate number of data points corresponding to one peak on a chromatogram;

a sampling time interval calculator configured to calculate a sampling time interval, which is a timing for acquiring data for creating a chromatogram, from the width of a peak inputted through the analysis condition setting unit and the information of the number of data points stored in the data point number storage; and an analysis control unit configured to control an operation of the mass spectrometer so as to acquire ion intensity data in the mass spectrometer according to the sampling time interval.

Since the peak width can be visually grasped from a chromatogram drawn generally on a display screen, it is easy for the operator to intuitively understand the peak width. Thus, with a chromatograph mass spectrometer according to Clause 1, even an operator who has little knowledge about chromatograph mass spectrometry or is unfamiliar with work for such analysis can set appropriate parameter values easily and without errors, and can execute analysis under such appropriate analysis conditions. That is, with a chromatograph mass spectrometer according to Clause 1, the work for setting analysis conditions in analysis becomes easy, and the operability or workability is improved.

(Clause 2) The chromatograph mass spectrometer according to Clause 1, where:

the analysis condition setting unit is configured to allow a user to set a plurality of work units for which a measurement time range and a predetermined analysis condition in the mass spectrometer are defined in addition to a width of a peak; and the chromatograph mass spectrometer further includes:
a work unit overlap information extraction unit configured to determine overlap of measurement time ranges for a plurality of work units set through the analysis condition setting unit and determine the number of work units to be carried out for each time period; and
a work unit time allotment unit configured to determine a time for carrying out each work unit by distributing the sampling time interval to a plurality of work units for a time period in which a plurality of work units overlap each other.

(Clause 3) The chromatograph mass spectrometer according to Clause 2, where the work unit time allotment unit can evenly distribute the sampling time interval to the plurality of work units that have overlapping time periods.

With a chromatograph mass spectrometer according to Clauses 2 and 3, in a case where the separation in the chromatograph unit is insufficient and there are a plurality of compounds having measurement time ranges overlapping each other at least partially, for example, analysis time can be appropriately allotted to a work unit corresponding to each compound. This makes it possible to create a chromatogram, with which quantitative determination of each compound can be performed with sufficient accuracy, for a plurality of compounds that have overlapping measurement time ranges.

REFERENCE SIGNS LIST

1 . . . Liquid Chromatograph Unit (LC Unit)
10 . . . Mobile Phase Container
11 . . . Liquid Feeding Pump
12 . . . Injector
13 . . . Column
2 . . . Mass Spectrometer Unit (MS Unit)
20 . . . Ionization Unit
21, 22 . . . Ion Guide
23 . . . Quadrupole Mass Filter
24 . . . Detector
25 . . . Chamber
3 . . . Control Unit
30 . . . Analysis Condition Setting Unit
301 . . . Analysis Condition Setting Screen Display Processor
302 . . . Analysis Condition Input Receiver
31 . . . Analysis Method Creation Unit
311 . . . Standard Data Point Number Storage
312 . . . Sampling Time Interval Calculator
313 . . . Event Overlap Information Extraction Unit
314 . . . Event Time Calculator
315 . . . Method File Creation Unit
32 . . . Analysis Control Unit
4 . . . Input Unit
5 . . . Display Unit
6 . . . Data Processor
100 . . . Analysis Condition Setting Screen
102 . . . Analysis Condition Setting Table
104 . . . Peak Width Input Setting Unit
106 . . . "Save" Button

The invention claimed is:

1. A chromatograph mass spectrometer including: a chromatograph unit configured to separate components in a sample; and a mass spectrometer configured to execute mass spectrometry on ions having a specific mass-to-charge ratio derived from a compound for each compound temporally separated by the chromatograph unit, the chromatograph mass spectrometer comprising:

an analysis condition setting unit configured to allow a user to input a width of a peak on a chromatogram as one of analysis parameters;

a data point number storage configured to store information on an appropriate number of data points corresponding to one peak on a chromatogram;

a sampling time interval calculator configured to calculate a sampling time interval, which is a timing for acquiring data for creating a chromatogram, from the width of a peak inputted through the analysis condition setting unit and the information of the number of data points stored in the data point number storage; and an analysis control unit configured to control an operation of the mass spectrometer so as to acquire ion intensity data in the mass spectrometer according to the sampling time interval.

2. The chromatograph mass spectrometer according to claim 1, wherein:

the analysis condition setting unit is configured to allow a user to set a plurality of work units for which a measurement time range and a predetermined analysis condition in the mass spectrometer are defined in addition to a width of a peak; and the chromatograph mass spectrometer further comprises:

a work unit overlap information extraction unit configured to determine overlap of measurement time ranges for a plurality of work units set through the analysis condition setting unit and determine the number of work units to be carried out for each time period; and a work unit time allotment unit configured to determine a time for carrying out each work unit by distributing the sampling time interval to a plurality of work units for a time period in which a plurality of work units overlap each other.

3. The chromatograph mass spectrometer according to claim 2, wherein the work unit time allotment unit is configured to evenly distribute the sampling time interval to the plurality of work units that have overlapping time periods.

* * * * *